(12) United States Patent
Friedrich

(10) Patent No.: US 6,393,687 B1
(45) Date of Patent: May 28, 2002

(54) MACHINE TOOL FOR THE PROCESSING OF WORKPIECES WITH CUTTING TOOL AND LASER BEAM

(75) Inventor: Wilfried Friedrich, Seeg (DE)

(73) Assignee: Deckel Maho GmbH, Pfronten (DE)

( * ) Notice: Subject to any disclaimer, the term of this patent is extended or adjusted under 35 U.S.C. 154(b) by 0 days.

(21) Appl. No.: 09/521,929

(22) Filed: Mar. 9, 2000

(30) Foreign Application Priority Data

Mar. 11, 1999 (DE) .......................... 199 10 880

(51) Int. Cl.⁷ .......................... B23P 23/04; B23K 26/00
(52) U.S. Cl. .................... 29/560; 219/121.67
(58) Field of Search ....................... 29/33 J, 560, 33 R, 29/40, 55; 83/552; 219/121.8, 121.78, 121.73, 121.62, 121.68, 121.67; 408/35; 409/203

(56) References Cited

U.S. PATENT DOCUMENTS

| 3,636,251 A | * | 1/1972 | Daly et al. ........... 219/121.62 X |
| 4,229,640 A | * | 10/1980 | Longo ................... 409/136 X |
| 4,352,973 A | * | 10/1982 | Chase ................. 219/121.217 |
| 4,833,764 A | * | 5/1989 | Müller ......................... 29/40 |
| 4,976,180 A | * | 12/1990 | Ono ......................... 83/552 X |
| 5,011,282 A | * | 4/1991 | Ream et al. ........... 219/121.78 |
| 5,168,610 A | * | 12/1992 | Ichimura et al. ............... 29/33 |
| 5,237,149 A | * | 8/1993 | Macken ................. 219/121.73 |
| 5,268,554 A | * | 12/1993 | Ream ....................... 219/121.8 |
| 5,376,061 A | * | 12/1994 | Suzuki ....................... 483/13 |
| 5,523,543 A | | 6/1996 | Hunter, Jr., et al. |
| 5,525,776 A | * | 6/1996 | Okamoto ............... 219/121.68 |
| 5,775,215 A | * | 7/1998 | Hirate ......................... 29/560 |
| 5,869,803 A | | 2/1999 | Noguchi et al. |

FOREIGN PATENT DOCUMENTS

| DE | 40 40 554 | | 7/1992 | |
| EP | 563399 | * | 10/1993 | ................... 29/560 |
| EP | 593783 A1 | * | 4/1994 | ..................... 483/1 |
| EP | 0 700 746 A1 | | 3/1996 | |
| JP | 114741 | * | 4/1999 | ................... 29/560 |

* cited by examiner

Primary Examiner—William Briggs
(74) Attorney, Agent, or Firm—The Maxham Firm

(57) ABSTRACT

A machine tool for selectively machining workpieces with cutting tools and a laser beam having a machining unit including a motor-driven work spindle for machining workpieces with cutting tools, a laser beam source including a beam guiding arrangement for machining workpieces with a laser beam, and a work table movable by means of a motor for clamping at least one workpiece thereto. To enable machining by means of cutting tools as well as machining by means of a laser beam with a construction of simple design without complicated exchange operations, the beam guiding arrangement is arranged on the machining unit so that it is displaced with respect to the work spindle.

10 Claims, 2 Drawing Sheets

MACHINE TOOL FOR THE PROCESSING OF WORKPIECES WITH CUTTING TOOL AND LASER BEAM

BACKGROUND

1. Field of the Invention.

The invention relates generally to a machine tool for machining workpieces, and more particularly to machining with cutting tools and a laser beam.

2. Discussion of Related Art.

A machine tool of the general type that is relevant here is known from German patent publication 40 40 554. There, the laser beam is guided from a laser beam source mounted on the rear end of a spindle head in the axial direction of the spindle head through a hollow horizontal work spindle to a nozzle head insertable into the work spindle and provided with focusing optics. For a changeover from cutting to machining by means of a laser beam in such a machine tool, however, first a relatively complex exchange operation on the work spindle from a cutting tool to the nozzle head for laser machining is required.

SUMMARY OF THE INVENTION

It is a primary purpose of this invention to provide a machine tool of the above mentioned type enabling machining by means of cutting tools as well as machining by means of a laser beam with a simplified construction and without complex exchange operations.

According to the invention, the purpose is accomplished by disposing the beam guiding arrangement on the machining unit so as to be offset with respect to the work spindle.

The machine tool of the invention has the important advantage that laser beam machining may be carried out without the necessity of first inserting a nozzle head provided with focusing optics or the like into the work spindle. In addition, even conventional machine tools may be retrofitted for laser beam machining in a simple way due to the, for example, lateral arrangement of the beam guide on the machining unit.

Thus, in a particularly efficacious embodiment, the beam guiding arrangement comprises a laser head arranged laterally on a milling head and comprising a scanner system enabling a faster guidance of a focused laser beam across a predetermined machining area of the workpiece, for example, for cutting the material in layers. The machining area predetermined by the scanner system may be widened in a simple way without additional drives by the moving capacities of the milling head and the work table. Therefore, an enlarged area laser beam machining without any re-chucking of the workpieces is enabled.

For deflecting the laser beam for scanning the surface within the predetermined machining area, the scanner system efficaciously comprises a first deflection mirror turnable about the vertical axis and a second deflection mirror turnable about the horizontal axis. With the aid of slidable or adjustable focusing optics or plane field optics a displacement of the focusing position due to a distance change caused by a rotation of the deflection mirrors may be compensated in the path of the laser beam. By using focusing optics and plane field optics, an even more accurate correction may be obtained.

In another advantageous embodiment, the laser head, including the scanner system, is arranged on the milling head so that the beam emerges from the laser head below the front end of the work spindle. In this way, a small distance between the workpiece and the laser head may be selected. The laser head including the scanner system may be either fixedly or detachably held on the milling head. A detachable arrangement has the advantage that the machining area for cutting is not limited by the laser head and that the laser head may be moved to a protected storage position on a tool magazine or the like, for example, by means of an automatic tool exchanger, for protecting the scanner system while cutting is performed.

BRIEF DESCRIPTION OF THE DRAWING

The objects, advantages and futures of the invention will be more clearly perceived from the following detailed description, when read in conjunction with the accompanying drawing, in which.

DETAILED DESCRIPTION OF THE PREFERRED EMBODIMENT

Figure 1:
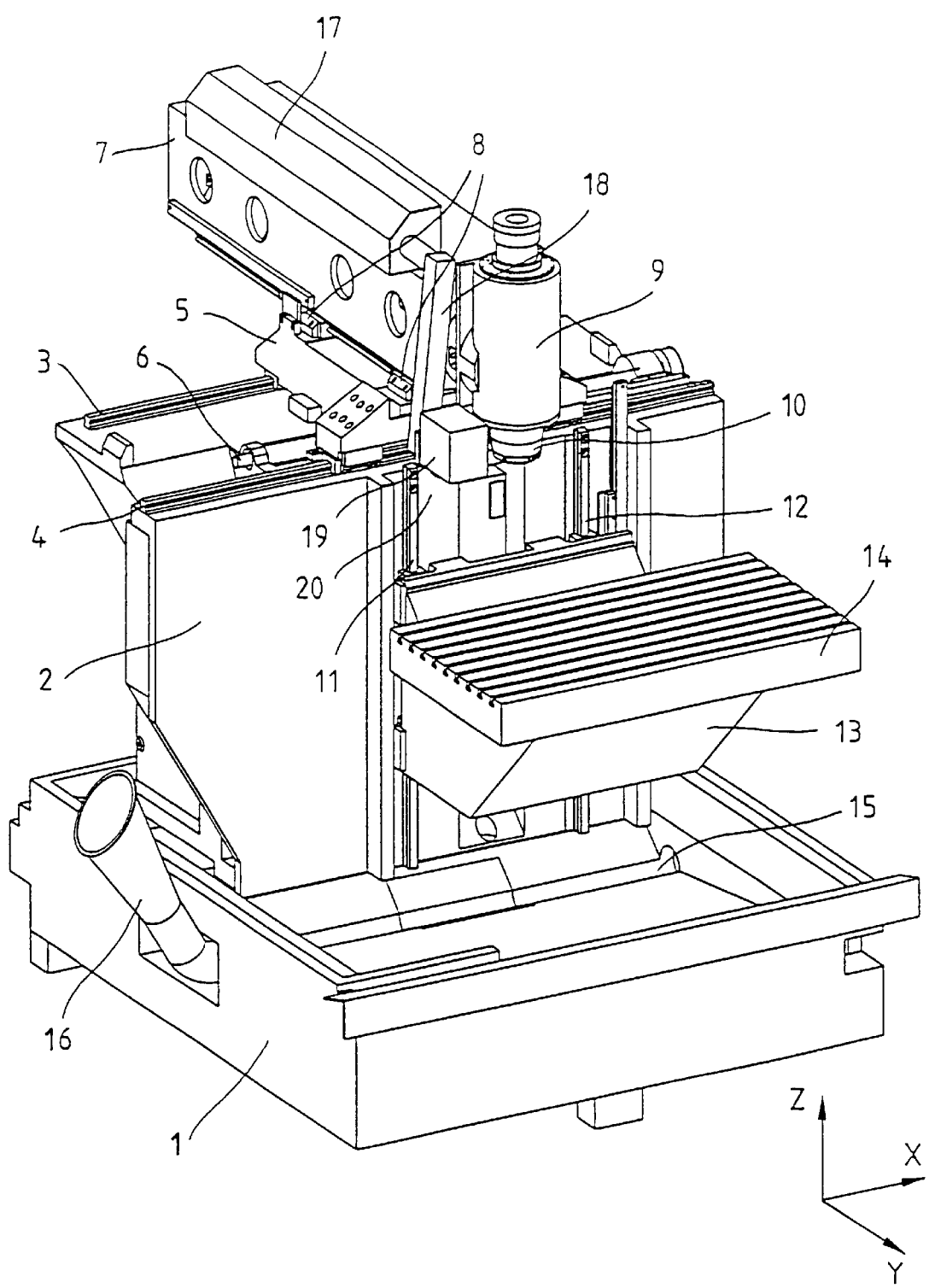
FIG. 1 is a perspective view of a machine tool constructed according to the invention.

The machine tool schematically shown in FIG. 1 comprises machine bed 1 to which dimensionally stable stand 2 is fixed. On the upper side of the stand, two parallel guiding rails 3 and 4 are disposed on which transverse sled 5 is movable along an X-axis by means of a motor via rotationally driven threaded spindle 6. On the upper side of the transverse sled head stock 7 is mounted which is movable along a Y-axis by means of a motor (not shown) via guides 8. Head stock 7 cares milling head 9 on its front side, work spindle 10 driven by a motor and including an inner clamping cone for receiving, for example, milling and drilling tools or tool holders being borne in the milling head.

On the front side of stand 2 vertical guiding rails 11 and 12 are mounted on which console 13, including workpiece table 14, is guided which is movable along a Z-axis by means of a motor. Below console 13 recess 15 is provided in machine bed 1, a worm (not shown) being disposed in the recess for removing the chips produced during machining through chip removing channel 16.

On head stock 7 Nd-YAG-laser 17, laterally displaced with respect to the central axis of the head stock, is disposed as a source from which a laser beam it generates is guided via beam guiding channel 18 to laser head 19 disposed laterally on milling head 9 and including scanner system 20 for focusing the laser beam and its guidance across a workpiece surface.

Figure 2:
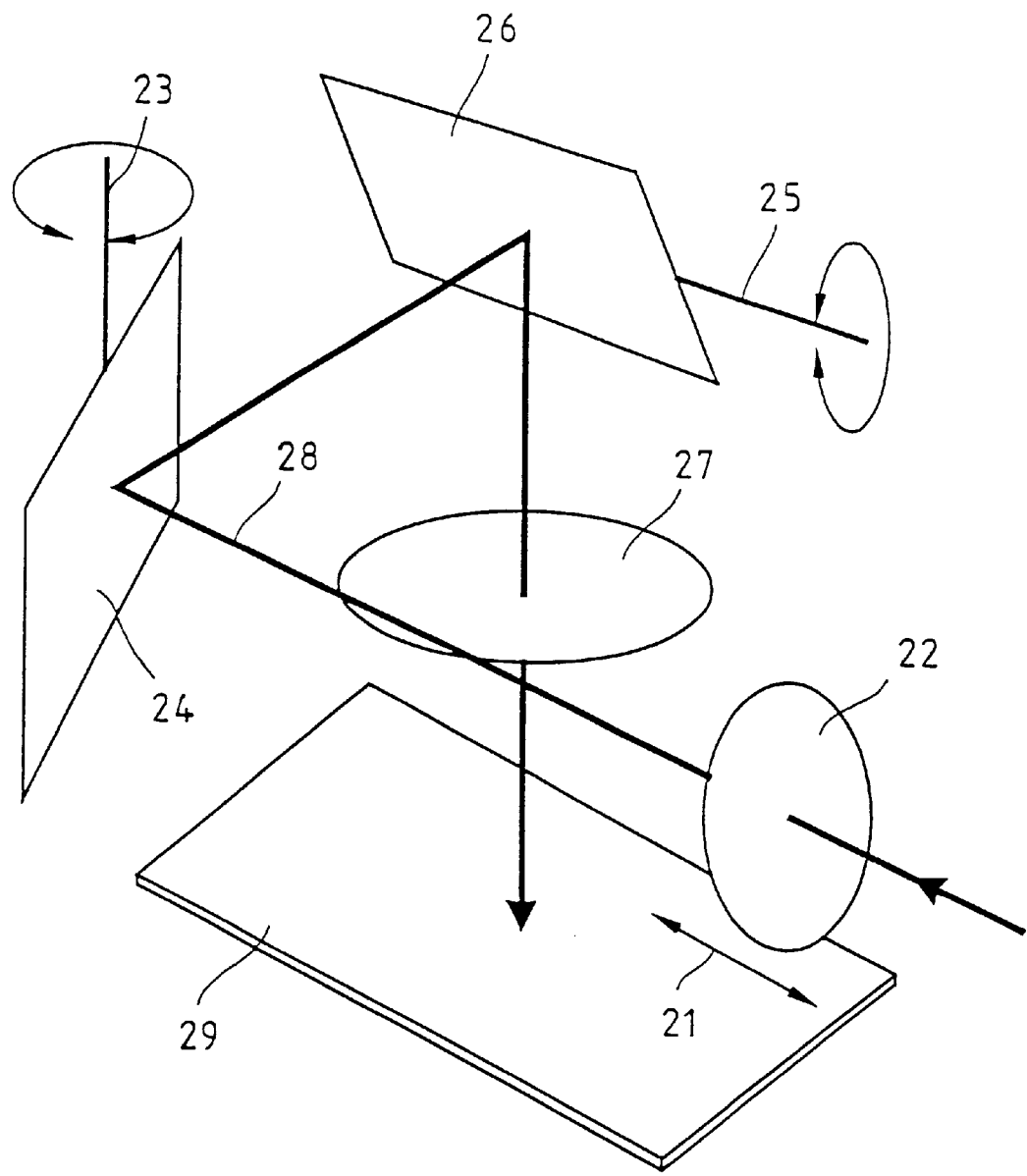
FIG. 2 is a schematic illustration of the construction of a scanner system provided on the machine tool of FIG. 1.

According to FIG. 2, the scanner system shown in FIG. 1 comprises focusing optics 22 movable in the direction of double arrow 21 first deflection mirror 24 rotatable about vertical axis 23, second deflection mirror 26 rotatable about horizontal axis 25, and plane field optics 27 by which laser beam 28 is directed to workpiece 29. By turning the two-deflection mirrors 24 and 26, focused lager beam 28 may be guided across the surface of the workpiece within a predetermined machining area for removing material therefrom. With the aid of focusing optics 22 movable in the direction of double arrow 21, a displacement of the focus position due to a difference in length in the path of the laser beam caused by a rotation of deflection mirrors 24 and 26 can be compensated. With plane field optics 27, it can be assured that the focal plane stays within a constant plane for scanning the workpiece surface even in the case of a deflection of the laser beam due to a rotation of the deflection mirrors.

The displacement of the focusing optics and the rotation of the deflection mirrors may be effected by driving motors (not shown) instructed by appropriate control or regulating means.

Within laser head 19, scanner system 20 is disposed on milling head 9 so that the beam emerges from the laser head below the front end of work spindle 10 and non-deviated laser beam 28 impinges the surface of workpiece 29 to be machined in parallel to the central axis of the work spindle. The laser head, including the scanner system, may be fixedly mounted on the milling head. However, the laser head, including the scanner system, may also be formed as a detachable unit which may, if required, be brought to its work position or removed to a storage position by a tool exchange system. In this way, the scanner system may be protected from contamination during cutting operations.

The operation of the machine tool according to the invention is clear from the drawing. For machining a workpiece by means of a laser beam, laser beam 28 generated in the Nd-YAG-laser and guided to scanner system 20 in laser head 19 through guiding channel 18, which is provided with deflection mirrors or waveguides, may be moved across the surface of a workpiece by rotating deflection mirrors 24 and 26 within the machining area limited by the turning capabilities of the deflection mirrors. The workpiece is shifted on workpiece table 14 along the Z-axis into a machining position below scanner system 20, for example, for removing the material in layers. That limited machining area may be widened by moving transverse sled 5 along the X-axis and by moving head stock 7, including milling head 9, along the Y-axis. In this way, wide area laser beam machining is enabled without any re-chucking of the workpiece. For carrying out a cutting operation, for example, a milling or drilling tool may be inserted into work spindle 10, for example, by means of a conventional tool exchanger (not shown). The exchange operations may be executed automatically with the aid of a control program.

The invention is not limited to the embodiment described in detail and shown in the drawing. Milling and drilling machines of another design or, if desired, even turning machines may also be provided with a laser head disposed in a displaced relation to the work spindle or a revolver. The machining unit, including the laser head, may as well be turnable to enable five-axis machining and to generate, for example, a logo or a developed image on a spatially curved surface. Additionally, a diode laser, a C02-laser or other lasers may be used instead of a Nd-YAG-laser.

What is claimed is:

1. A machine tool for machining work pieces with cutting tools and a laser beam, the machine tool comprising:
    a machine bed with an upright stand fixed thereto;
    a machining unit including a work spindle for machining workpieces with cutting tools;
    means for coupling said machining unit for X- and Y-axis motion with respect to said machine bed, said means for coupling comprising:
        a transverse sled movably displaced on said upright stand, said sled being movable along the X-axis; and
        an elongated head stock having a central axis and movably displaced on said transverse sled, said head stock being movable along the Y-axis and upon one end of said head stock said machining unit is mounted; and
    a laser beam apparatus mounted on said head stock proximate said work spindle, said apparatus comprising:
        a laser source disposed along an axis laterally of said central axis; and
        a beam guiding arrangement for machining workpieces with said laser beam, said beam guiding arrangement being disposed on said machining unit so as to be offset with respect to said work spindle, said beam guiding arrangement comprising a beam guiding channel extending generally transverse to said laser source axis and a laser head including a scanner system for Focusing the laser beam and its guidance over a predetermined machining area of the workpiece; and
    a work table movably mounted on said upright stand for clamping at least one workpiece thereto, said work table movable along the Z-axis.

2. The machine tool according to claim 1, wherein said scanner system comprises shiftable focusing optics for adjusting the focusing of the laser beam.

3. The machine tool according to claim 1, wherein said scanner system comprises shiftable focusing optics and plane field optics for adjusting the focusing of the laser beam.

4. The machine tool according to claim 1, wherein said scanner system comprises plane field optics for adjusting the focusing of the laser beam.

5. The machine tool according to claim 1, wherein said machining unit is a milling head or revolver or tool carrier on which said laser head including said scanner system is disposed in a displaced manner in relation to the work spindle or revolver.

6. The machine tool according to claim 1, wherein said laser head, including said scanner system, is selectively fixedly or detachably mounted on the machining unit by a mounting means.

7. The machine tool according to claim 1, wherein said work spindle has a front end and wherein said laser head, including said scanner system, is arranged on said machining unit so that the laser beam emerges from said laser head below the front end of the work spindle.

8. The machine tool according to claim 1, wherein said beam guiding arrangement comprises a beam guiding channel leading from a laser beam source to a scanner system.

9. The machine tool according to claim 1, wherein said laser beam source is reflected from the group consisting of a Nd-YAG-laser, a diode laser and a $CO_2$-laser which is displaced with respect to the central axis of said machining unit.

10. The machine tool according to claim 1, wherein said scanner system comprises a first deflection mirror turnable about a vertical axis and a second deflection mirror turnable about a horizontal axis.

* * * * *